Patented Oct. 19, 1954

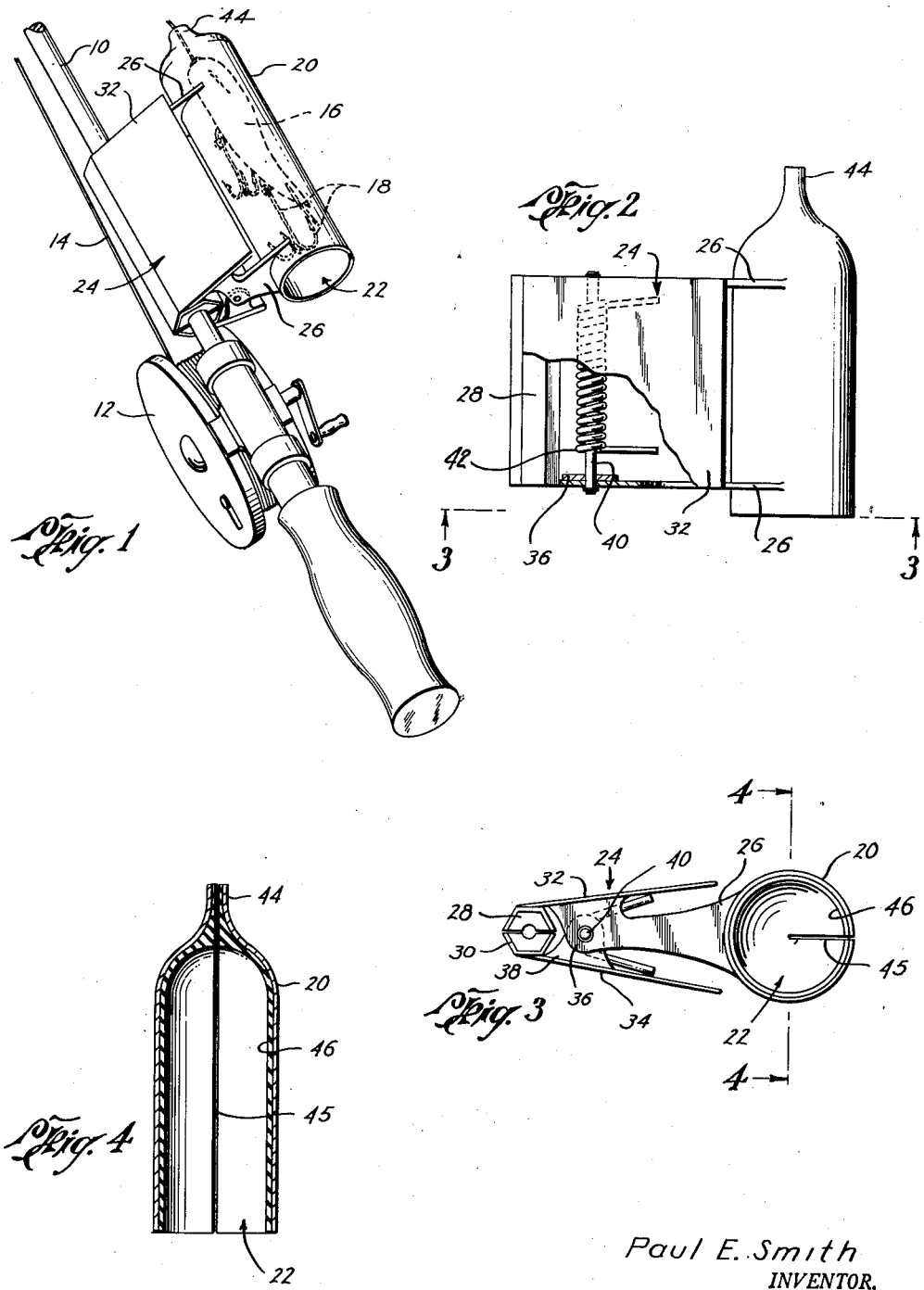

2,691,840

UNITED STATES PATENT OFFICE 2,691,840

BAIT RETAINER AND HOOK PROTECTIVE DEVICE FOR FISHING TACKLES

Paul E. Smith, Houston, Tex.

Application November 4, 1950, Serial No. 194,058

1 Claim. (Cl. 43—25.2)

This invention relates to a bait retainer and hook protective device for fishing tackle, and more particularly to a holder adapted to be associated with a fishing rod or the like for receiving and confining one or more fish hooks connected to a fishing line to prevent the hooks from becoming caught in some surrounding object when the tackle is not being used.

The invention has for its primary object the provision of means for housing artificial bait, hooks or the like, attached to a fishing line, when not being used for fishing, in order to prevent the hook from catching in surrounding objects.

Another object of the invention is the provision of a housing structure having means for attaching the same to a fishing rod or the like and adapted to receive and confine artificial bait, hooks, or the like attached to the fishing line, whereby the hooks may be left attached to the line while the fishing tackle is being carried about, without danger of snagging persons or objects in the immediate vicinity.

A further object of the invention is to provide a retainer or holder for artificial bait, hooks and the like, which may be readily attached to or removed from a fishing pole, and by which the hooks may be left attached to the fishing line, thus making it unnecessary to remove the bait, or hooks when the fishing tackle is not being used.

A still further object of the invention is the provision of a holder or retainer of the kind mentioned, which is of simple design and rugged construction, capable of withstanding the extreme conditions of exposure and hard usage to which such a device is likely to be subjected.

The invention will best be understood from the following detailed description, constituting a specification of the same when considered in connection with the annexed drawing wherein—

Figure 1 is a perspective view showing the invention in use on a fishing rod;

Figure 2 is a side elevational view of the invention, partly broken away and partly in cross sections, revealing the relationship of the various parts;

Figure 3 is an end view of the invention taken along the line 3—3 of Figure 2, looking in the direction indicated by the arrows;

Figure 4 is a cross-sectional view taken along the line 4—4 of Figure 3 looking in the direction of the arrows.

Referring now to the drawing in greater detail, wherein like numerals of reference are used to designate the same parts throughout the several views, the numeral 10 indicates a fishing rod of conventional design, provided with a reel 12 and line 14. To the free end of the line any suitable type of bait may be attached, such as the artificial lure indicated at 16 having one or more fish hooks 18 attached thereto. The above described arrangement constitutes conventional fishing tackle forming no part of the present invention.

The invention, as shown in the present illustration, comprises a housing 20 of suitable configuration, having an open end 22 adapted to receive the bait, fish hooks or the like. This housing is preferably secured in any suitable manner, to a clamp structure, indicated generally at 24, having outwardly extending base lugs 26 upon which the housing is mounted.

In the present illustration the clamp takes the form of opposed jaw members 28 and 30, adapted to clampingly receive the fishing rod 10, which jaws are mounted on hinge plates 32 and 34 respectively. The hinge plates are each formed with spaced hinge lugs at their opposite ends as indicated at 36 and 38, which lugs may be arranged in overlapping relation and secured together by the hinge pin 40 extending through perforations in the lugs. A resilient member 42, in the form of a coil spring, is disposed on the hinge pin 40, and has its opposite ends extended outwardly to engage the hinge plate 32 and 34 to urge the plates apart in a direction to move the clamping jaws 28 and 30 into clamping engagement with the fishing rod.

The housing 20 may be formed with an outwardly extending neck portion 44 opposite the opening 22, and is provided with a longitudinal slot 45 extending from end to end thereof from the opening 22 to the outward end of the neck 44. A lining 46, preferably of resilient material, such as rubber or the like may be provided on the interior of the housing and extending into the neck 44 thereof. The gripping jaws 28 and 30 may also be provided with grooved linings 48 and 50 respectively, of suitable material for gripping the fishing rod.

In making use of the invention as described above, the hinge plates 32 and 34 may be pressed together to move the gripping jaws 28 and 30 apart, whereby the clamp may be positioned over the fishing rod 10, and upon release of the hinge plates, the jaws are urged into gripping relation with the rod by the resilient member 42. In this position of the device the housing 20 will be disposed substantially parallel to the fishing rod and space therefrom. The fishing line 14 may then be inserted in the slot 45 and upon reeling in the fishing line the lure 16 and the hooks 18 will be drawn into the housing and retained therein as seen in Figure 1. Thus housed in the housing 20 the fish hooks will be enclosed so that they cannot hook into any surrounding object, and the fishing tackle can be transported with safety, and without danger of injury to persons in the vicinity. Moreover, by the use of the invention, it is unnecessary to remove the bait or hook from the line while carrying the fishing tackle from one place to another, or while the tackle is not being used, thus saving a great deal of annoyance and inconvenience to the user, while at the same time protecting persons and objects against injury from flying contact with the hooks.

The invention, as above described, thus provides a simple and easily manufactured device filling a long felt want among fishermen, and one which may be conveniently applied to any kind of fishing rod and used with bait and fish hooks of any kind. To remove the lure and hook from the housing, it is only necessary to unreel a portion of the line, whereupon the line may be slipped out of the groove 45 and the lure allowed to drop out of the open end of the housing.

While the invention has been disclosed in connection with a particular embodiment of the same, it will be understood that this is intended by way of illustration only, and many changes can be made in the construction and arrangement of the various parts without departing from the spirit of the invention or the scope of the appended claims.

Having thus clearly shown and described the invention what is claimed as new and desired to secure by Letters Patent is:

A bait and hook holder for fishing tackle comprising a tubular body, clamp means attached to the body and clampingly engageable with a support for detachably securing the body to the support, the forward surface of said body being reversely curved to provide an axially extending reduced neck portion at one end and said body having a longitudinal slot extending from end to end of the body, and a substantially tubular lining of resilient material in the body extending into said neck portion, said lining having a slot therein coextensive with the slot in said body and said lining being grippingly engageable in said neck portion with a line passing longitudinally through the body.

References Cited in the file of this patent

UNITED STATES PATENTS

| Number | Name | Date |
|---|---|---|
| 337,045 | Carter | Mar. 2, 1886 |
| 933,520 | Zimmerer | Sept. 7, 1909 |
| 2,285,888 | Benton | June 9, 1942 |
| 2,401,836 | Shelton | June 11, 1946 |
| 2,464,880 | McCombs | Mar. 22, 1949 |
| 2,627,133 | Pletcher | Feb. 3, 1953 |